United States Patent [19]

Bannister et al.

[11] Patent Number: 4,743,958
[45] Date of Patent: May 10, 1988

[54] MULTIPLE TELEVISION STANDARDS INPUT SELECTOR AND CONVERTOR

[75] Inventors: Richard S. Bannister, Grass Valley; James E. Blecksmith, Nevada City, both of Calif.

[73] Assignee: The Grass Valley Group, Inc., Grass Valley, Calif.

[21] Appl. No.: 915,821

[22] Filed: Oct. 6, 1986

[51] Int. Cl.⁴ .............. H04N 11/22; H04N 7/01; H04N 5/262
[52] U.S. Cl. ...................... 358/11; 358/22; 358/140; 358/181
[58] Field of Search .......... 358/140, 181, 183, 185, 358/22, 93, 11, 21 R, 148, 152, 153, 188, 145

[56] References Cited

U.S. PATENT DOCUMENTS

| | | | |
|---|---|---|---|
| 3,904,817 | 9/1975 | Hoffman et al. | 358/140 |
| 4,301,475 | 11/1981 | McCoy | 358/181 |
| 4,349,839 | 9/1982 | McGinn | 358/140 X |
| 4,357,624 | 11/1982 | Greenberg | 358/22 |
| 4,504,860 | 3/1985 | Nicol et al. | 358/133 |
| 4,532,547 | 7/1985 | Bennett | 358/181 X |
| 4,652,906 | 3/1987 | Baugh | 358/22 |
| 4,658,284 | 4/1987 | Kawamura et al. | 358/140 X |

FOREIGN PATENT DOCUMENTS 2010631 6/1979 United Kingdom ............... 358/181

*Primary Examiner*—James J. Groody
*Assistant Examiner*—Victor R Kostak
*Attorney, Agent, or Firm*—Francis I. Gray

[57] ABSTRACT

A multiple television standards input selector and convertor selects a video signal from among a plurality of television standard format input sources including encoded video, analog component video and digital video. The selected video signal is converted to a predetermined standard format video signal for further processing by a digital video effects device. The selection of the video signal occurs within a vertical interval period so that no visible effect is detectable on a display when switching between video sources.

9 Claims, 2 Drawing Sheets

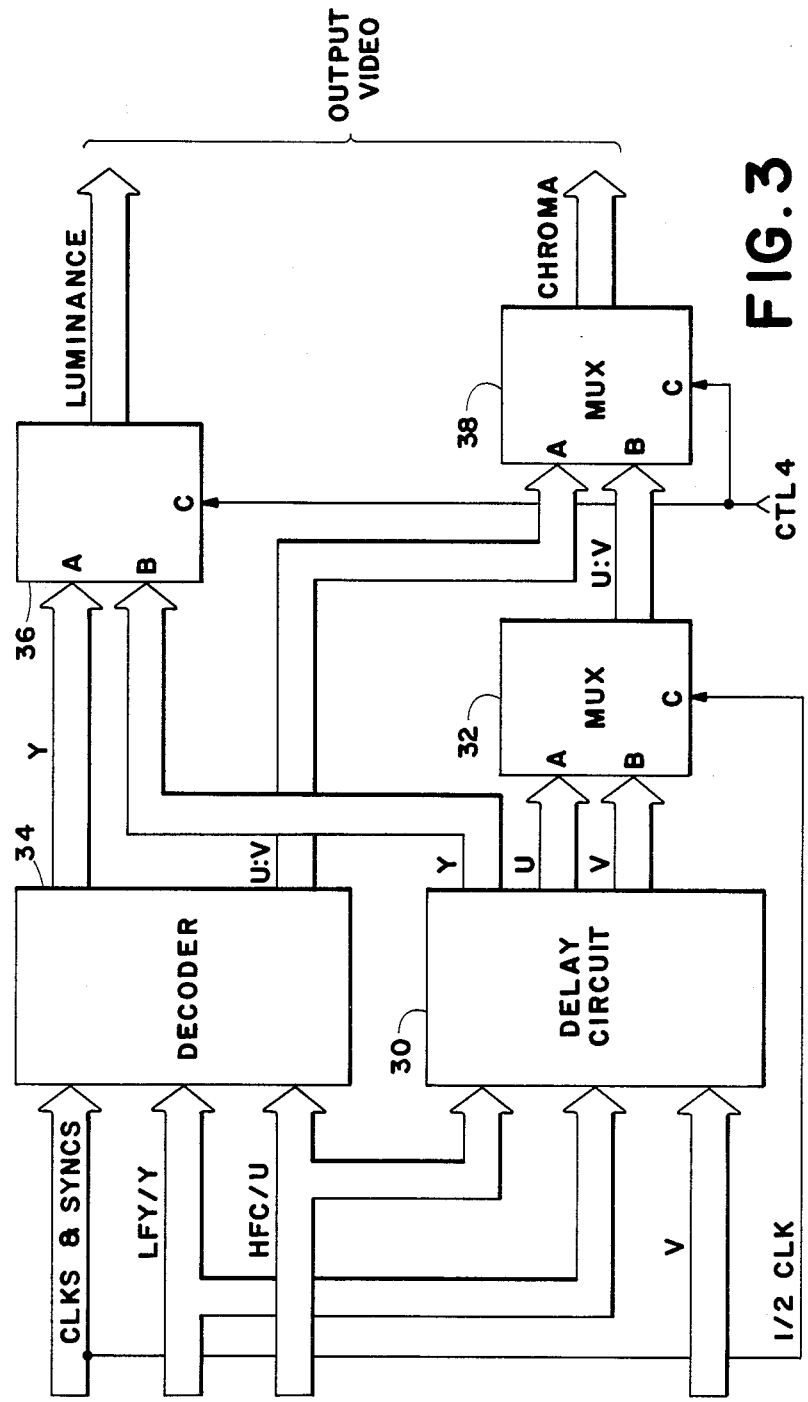

MULTIPLE TELEVISION STANDARDS INPUT SELECTOR AND CONVERTOR

BACKGROUND OF THE INVENTION

The present invention relates to signal input selectors, and more particularly to a multiple signal input selector and convertor for selecting from among a plurality of input video sources having various television standard format signals and converting the selected signal to a particular output standard television format.

In a television production studio there are source materials in three basic television standard formats—encoded (NTSC, PAL, SECAM or the like depending upon the television standard broadcast format of the particular country in which the source originates), analog component (RGB or YUV) and digital (CCIR 601 or SMPTE RP 125). To use a digital video effects device which accesses all these source materials has required separate decoding devices for each source to convert each source to one particular standard format and then individually connecting each converted source to the input of the digital effects device. This results in multiple pieces of equipment devoted to this conversion process as well as discontinuities in a display while sources are being switched at the input of the digital video effects device.

What is desired is a means for inputting any signal television source to the digital video effects device without the need for external conversion units so that an operator can select from the sources without any noticeable effect upon the output display.

SUMMARY OF THE INVENTION

Accordingly the present invention provides a multiple television standards input selector and convertor for a digital video effects device which under microprocessor control allows for clean transitions between television standard formats on a field by field basis. Analog signals are input to a video crosspoint matrix for selection of the desired input. Digital signals are input to a digital video separator from which the desired output standard digital video and sync are derived. An analog video processing circuit processes the analog input according to the signal type and commands from the microprocessor to produce the desired standard digital video output for analog component inputs, or to produce LFY/HFC components for encoded inputs. A sync generator locks to the various types of inputs and provides the sync and clock signals for the rest of the circuits. A digital selector selects between the digitized analog signals and the separated digital video input. A decoder receives the selected digitized signal, provides further processing of the encoded digitized analog (LFY/HFC), and outputs the desired standard format digitized video for further processing by the digital video effects device.

The objects, advantages and novel features of the present invention will be apparent from the following detailed description when read in conjunction with the appended claims and attached drawing.

BRIEF DESCRIPTION OF THE DRAWING

FIG. 3 is a block diagrammatic view of the digital selection circuitry for final processing of the digitized television signal for outputting to a digital video effects device according to the present invention.

DESCRIPTION OF THE PREFERRED EMBODIMENT

Figure 1:
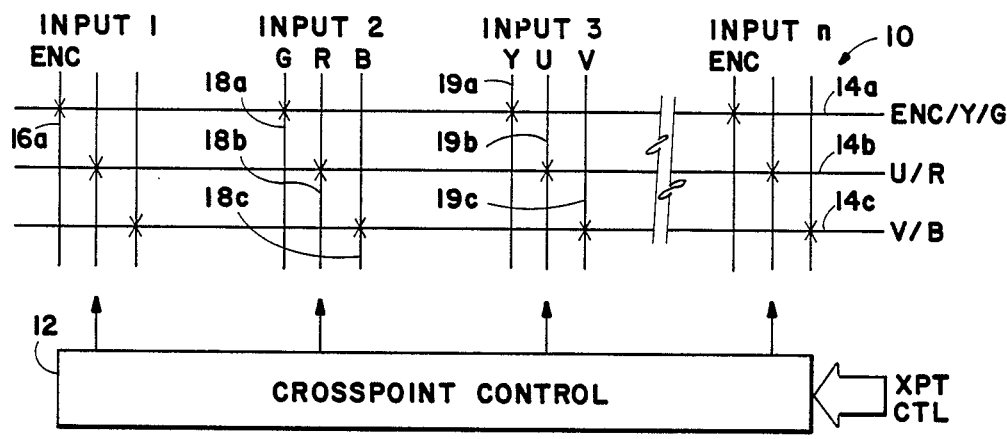
FIG. 1 is a block diagrammatic view of a crosspoint switching network for selecting an analog television input signal according to the present invention.
Figure 2:
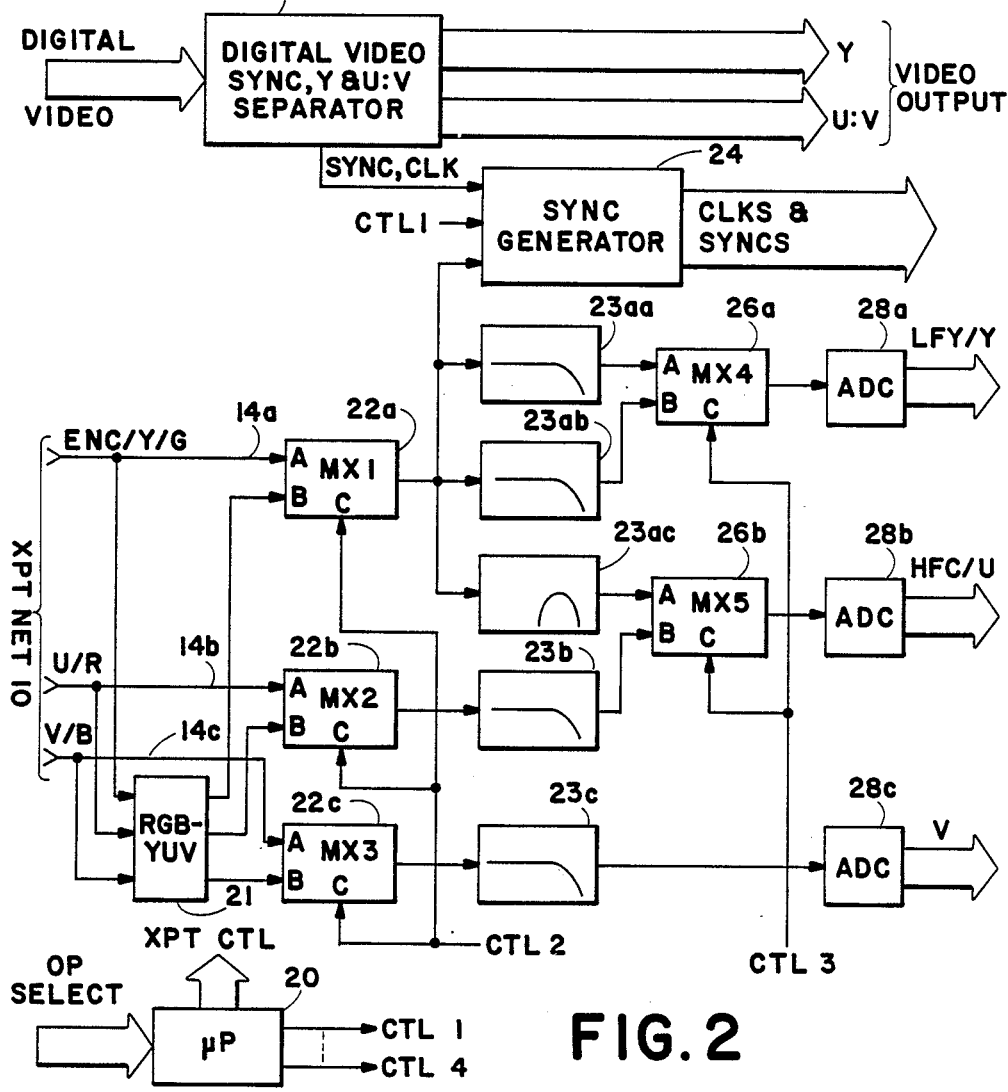
FIG. 2 is a block diagrammatic view of the signal processing circuitry for deriving a desired standard format from the selected input television signal according to the present invention.

Referring now to FIGS. 1-3 analog video signals configured according to various television standards, such as encoded video (NTSC, PAL, SECAM or the like) or analog component (RGB or YUV), are input to a crosspoint switching circuit 10. The crosspoint switching network 10 is controlled by a crosspoint controller 12 which selects the particular input to be transmitted on the output lines 14a, 14b, 14c. As shown in FIG. 1 encoded video ENC is input at one of a plurality of source inputs, such as INPUT1, on one of the three input lines 16a; RGB component video is input over the three input lines 18a, 18b, 18c at a second source input; and YUV component video is input at a third source input over the three input lines 19a, 19b, 19c. An XPT CTL signal from a microprocessor 20 under control of an operator selects the desired input so that the output lines 14a, 14b, 14c respectively have ENC, Y or G; U or R; and V or B. These three output lines 14a, 14b, 14c are connected to respective input multiplexers 22a, 22b, 22c and an RGB to YUV transcoder 21. The second input of the input multiplexers 22a, 22b, 22c is the output from the RGB to YUV transcoder 21. If the input analog signal selected is RGB, the CTL2 command from the microprocessor 20 will cause the input multiplexers 22a, 22b, 22c to output the converted YUV signals from the RGB to YUV transcoder 21. Otherwise the selected YUV or encoded input signals are output by the input multiplexers 22a, 22b, 22c.

The outputs of the input multiplexers 22a, 22b, 22c are input to respective filters 23aa, 23ab, 23ac, 23b, 23c, and the output of the first input multiplexer 22a is also input to a sync generator 24. Also input to the sync generator 24 is the output timing information, sync and clock, from a digital video separator circuit 25. A CTL1 command from the microprocessor 20 selects the input to the sync generator 24 according to the type of input video signal selected. The sync generator 24 outputs the timing signals required for the remainder of the selector and convertor circuits, such as horizontal and vertical sync, subcarrier (3.58 MHz) and 6.75 MHz, 13.5 MHz or 13.5/14.3 MHz clocks, while the digital video separator 25 also outputs the digital video input in Y/U:V format, i.e., an interlaced chrominance component format, the desired format for one particular digital video effects device. Filters 23aa, 23ac separate the encoded input into a low frequency luminance LFY and a high frequency chrominance and luminance HFC signal, respectively. Filters 23ab, 23b and 23c provide proper filtering for YUV signals. Intermediate multiplexers 26a, 26b under command CTL3 from the microprocessor 20 select either the LFY/HFC or Y/U filtered signals from filters 23aa, 23ac or 23ab, 23b, respectively. The outputs from the intermediate multiplexers 26a, 26b together with the output from filter 23c are digitized by respective analog to digital converters ADC 28a, 28b, 28c to produce respective digitized LFY or Y, HFC or U and V components.

The digitized LFY or Y, HFC or U and V signals are input to a compensating delay circuit 30 which outputs the YUV components. The U and V components are input to a multiplexer 32 which is clocked at a clock rate ½CLK from the sync generator 24 to produce a U:V, or chrominance, output. The LFY or Y and HFC or U signals are also input to a decoder 34 where the encoded LFY and HFC are converted by conventional methods, such as an adaptive comb filter, to separate the high frequency luminance from the HFC signal to produce the chrominance signal, the high frequency luminance being added to the LFY signal to produce the full bandwidth luminance signal Y. The separated chrominance signal is then demodulated into the U:V signal and both the Y and U:V signals are converted from the encoded video sample rate to a standard output sample rate. The luminance components Y from the decoder 34 and the compensating delay circuit 30 are input to a luminance multiplexer 36, and the chrominance components U:V from decoder 34 and the multiplexer 32 are input to a chrominance multiplexer 38. The luminance and chrominance multiplexers 36, 38 are controlled by a command CTL4 from the microprocessor 20 to select either the encoded video or the analog video represented respectively by the LFY/HFC signals or the YUV signals. The timing for the decoder circuits 34 is derived from the sync generator 24.

The digital video television standard input is a Y and U:V multiplexed signal at 27 MHz. Horizontal and vertical sync signals are encoded within the Y/U:V data. The Y and U:V signals are separated into two 13.5 MHz sampled, digital signals by the digital video separator 25. The digital video separator 25 also decodes the horizontal and vertical sync signals which are supplied to the sync generator 24.

The sync generator 24 produces from any type of analog or digital video input horizontal and vertical sync pulses and a 13.5 MHz clock phase locked to horizontal sync. If the input is encoded video, CTL1 causes the sync generator 24 to also produce a color subcarrier and a 14.3 MHz clock (four times subcarrier) phase locked to the subcarrier. The control signals CTL1-CTL4 from the microprocessor 20 are timed to occur during the first part of the vertical interval so that the phase locking circuits within the sync generator 24 can respond to these control changes and be stabilized before the end of the vertical interval. This allows for selection of a different type television input source between fields so no effect is visible on an output display.

Although the present invention has been described as producing a standard Y/U:V output, any standard television type may be the desired output type according to the type of format upon which the digital video effects device operates.

Thus the present invention provides a multiple television standards input selector and convertor circuit for a digital video effects device which under microprocessor control allows for the selection of a video input from among a multiple of television standard format types within a vertical interval so that no visible effect appears upon a display when switching between video sources.

What is claimed is:

1. A multiple television standards input selector and convertor to which is input a plurality of types of video input sources having different standard television formats comprising:

means for selecting one video input source from among the plurality of video input sources;

means for converting the video signal from the selected video input source to an output video signal having a predetermined standard television format; and means for controlling the selecting and converting means according to the standard television format of the selected video input source such that the transition to the selected video input source occurs within a single vertical interval between fields of the video signal.

2. A selector and convertor as recited in claim 1 further comprising means for deriving from the selected video input source synchronization and timing signals for the converting means.

3. A selector and convertor as recited in claim 1 wherein the selecting means comprises:

means for switching between the plurality of video input sources which represent analog video sources, the analog signal from the selected analog video source being digitized by the converting means to produce a digitized analog video signal; and means for selecting between one of the video input sources having a digital video signal and the digitized analog video signal from the switching means.

4. A selector and convertor as recited in claim 1 wherein the converting means comprises:

means for separating video component and timing signals from a digital video source, the digital video signal being input by one of the video input sources, the video component signal being the output video signal; and means for processing an analog video signal, the analog video signal being input by one of the video input sources, to produce the output video signal.

5. A selector and convertor as recited in claim 4 wherein the processing means comprises:

a plurality of filters having as inputs the analog video signal;

means for selecting the outputs of selected ones of the plurality of filters according to the standard television format of the analog video signal; and means for digitizing the output of the selected ones of the plurality of filters to produce a digitized analog video signal.

6. A selector and convertor as recited in claim 5 wherein the processing means further comprises means for converting the analog video signal, having a standard RGB television format, into a luminance component and two chrominance components.

7. A selector and convertor as recited in claim 6 wherein the processing means further comprises means for multiplexing the two chrominance components such that when combined with the luminance component the output video signal is produced.

8. A selector and convertor as recited in claim 5 wherein the processing means further comprises means for decoding the analog video signal, having an encoded video standard television format, to produce the output video signal.

9. A selector and convertor as recited in claim 1 wherein the output video signal comprises a component digitized signal having a luminance component and an interlaced chrominance component.

* * * * *